(No Model.) 3 Sheets—Sheet 1.
H. O. THOMAS.
TREE OR SHRUB BALER OR BINDER.
No. 494,352. Patented Mar. 28, 1893.
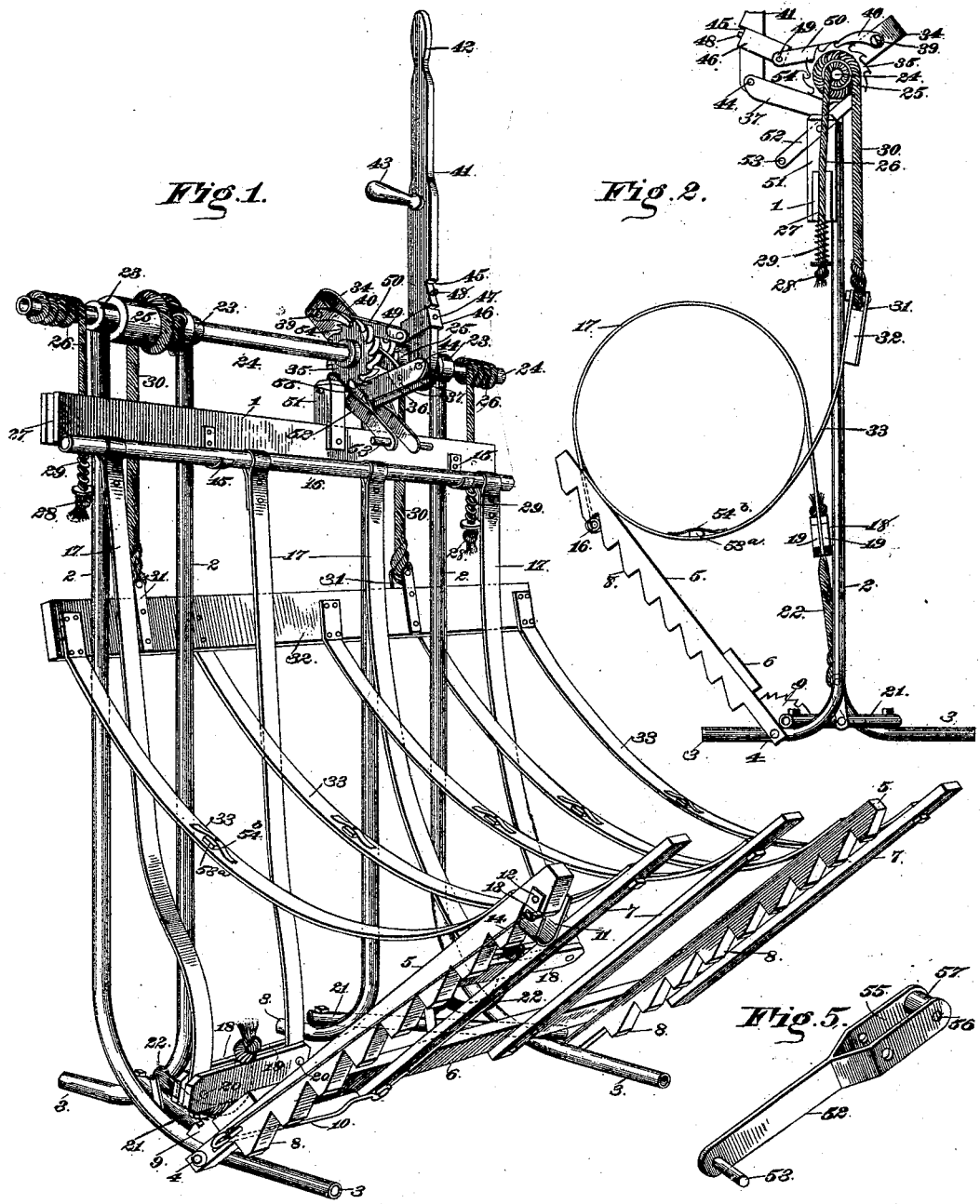
Witnesses
M. Fowler
J. R. Liggett
Inventor
Henry O. Thomas
By his Attorneys,
C. A. Snow & Co.

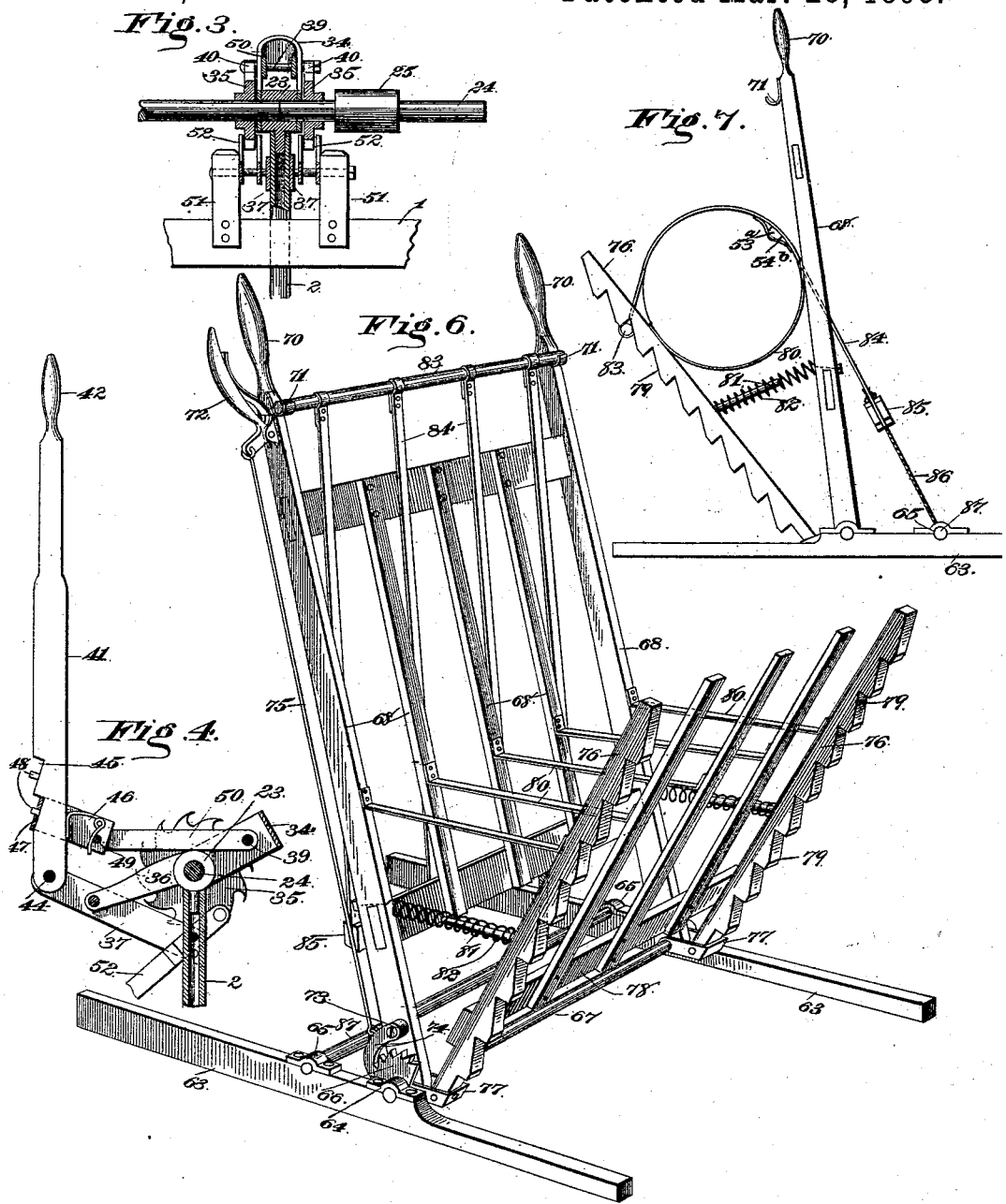

(No Model.) 3 Sheets—Sheet 3.
H. O. THOMAS.
TREE OR SHRUB BALER OR BINDER.
No. 494,352. Patented Mar. 28, 1893.
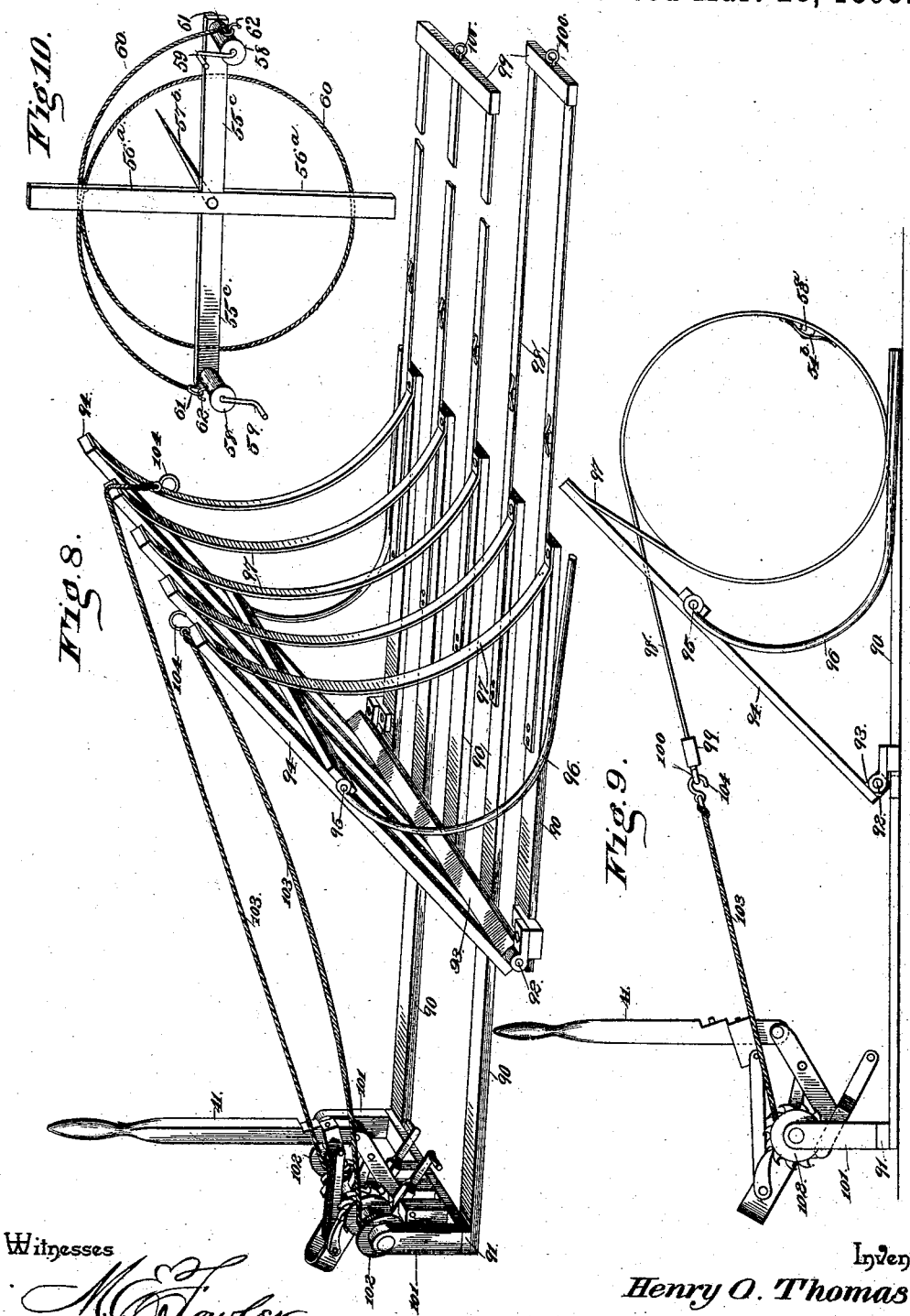
Witnesses
M. E. Fowler
J. H. Siggers
Inventor
Henry O. Thomas
By his Attorneys,
C. A. Snow & Co.

UNITED STATES PATENT OFFICE.

HENRY O. THOMAS, OF KIMBALL, ASSIGNOR OF ONE-HALF TO JOHN W. STEVENSON, OF NORTH BEND, NEBRASKA.

TREE OR SHRUB BALER OR BINDER.

SPECIFICATION forming part of Letters Patent No. 494,352, dated March 28, 1893.

Application filed April 1, 1892. Serial No. 427,391. (No model.)

*To all whom it may concern:*

Be it known that I, HENRY O. THOMAS, a citizen of the United States, residing at Kimball, in the county of Kimball and State of Nebraska, have invented a new and useful Tree or Shrub Baler or Binder, of which the following is a specification.

My invention relates to a machine for baling or bundling trees, saplings, shrubs, &c.

The objects in view are to provide a machine of cheap and simple construction and of convenient operation, whereby trees, shrubs, and saplings may be compactly bundled or baled for the purpose of storage or transportation.

Various other objects and advantages of the invention will appear in the following description, and the novel features thereof will be particularly pointed out in the claims.

Referring to the drawings—Figure 1 is a perspective view of a baling machine constructed in accordance with my invention and illustrating my preferred form. Fig. 2 is a side elevation of the same, the straps being in the position occupied by them when forming a bale. Fig. 3 is a detail of the upper portion of Fig. 1, the same being illustrated in section. Fig. 4 is a similar view, the same being in transverse section. Fig. 5 is a detail in perspective of one of the holding-pawls. Fig. 6 is a detail in perspective of a modified construction of machine. Fig. 7 is a side elevation of the same, the parts being in the position they occupy when in the act of forming a bale. Fig. 8 is a perspective view of a second modified construction of the machine. Fig. 9 is a side elevation of the same, the parts being shown in the position assumed by them when in the act of forming the bale. Fig. 10 is a detail in perspective of a device for binding the baling material during the application of the cord.

Like numerals of reference indicate like parts in all the figures of the drawings.

Referring more particularly to Figs. 1 and 2 of the drawings, 1 designates a transverse beam or sill, which is supported by a series of, in this instance, four standards 2, arranged at intervals, though the number may be increased or decreased as desired, and in accordance with the length of the machine manufactured. These standards 2 may have their lower ends bent in opposite directions as at 3, in order to constitute a suitable base, or they may be mounted upon a base, such being mere details of construction, to which I do not limit my invention. In this instance, I pivot by bolts 4, to the outer and forwardly bent lower ends of the standards 2, a pair of finger-bars 5, and these are connected by a transverse bar 6, to which are rigidly connected an intermediate pair of similar fingers 7, though more may be employed if preferred. The fingers 5 are provided upon their front faces with a series of inclined notches or teeth 8. By this construction it will be seen that the series of fingers and the transverse connecting-bar 6 constitute a pivoted frame or cradle adapted to swing to and from the series of standards 2.

Upon one of the bolts 4 a ratchet-wheel or disk 9 is rigidly secured, and adapted to engage therewith is a locking pawl 10, which may be thrown into and out of engagement with said wheel for the purpose of locking the cradle frame as a whole at any desired inclination. The pawl is secured to an adjacent finger-bar 7, and may be operated by any suitable means, in this instance by a swinging bail 11, having its terminals pivoted by a bolt 12, to the upper end of the before-mentioned finger or bar 5. A lug 13, is formed upon the side of the bail and a wire 14, leads from said lug to the bail. When the bail is swung to the front the pawl will engage with the teeth of the locking-ratchet, and when swung to the rear, over the upper end of the finger or bar 5, the lug then being carried to the opposite side of the pivot-bolt will serve to withdraw the pawl from locking engagement with the ratchet wheel. Any other means may be provided for accomplishing this purpose: namely, locking the cradle frame at any desired angle, or with relation to the series of standards 2.

In a series of brackets 15, secured to the front face of the beam 1, there is removably supported a transverse bar 16, and from the same there depends, in this instance, a series of straps 17, which, for the purpose of convenience, I will designate as the top-straps. This number may be increased or diminished as may be desired. These straps depend from the bar 16, and are connected to one or a series of eveners or equalizers 18. In constructing these eveners or equalizers, I preferably form each of a pair of sections 19, binding the sections together by means of binding-bolts 20. Between these sections terminate the lower ends of the straps 17, and through the straps the bolts 20 pass. It will be understood that this is simply one manner of constructing the evener, to which I do not limit my invention.

The forward ends of the two outer standards 2 are connected to the rear ends of the two adjacent, though oppositely turned, standards 2 by means of diagonally disposed connecting-bars 21, and each bar is provided with an eye or other device, around which the lower end of a rope 22 may be half-hitched or otherwise connected. The upper ends of these ropes are passed between the sections 19 of their respective eveners or equalizers 18 and knotted thereabove, whereby they are prevented from withdrawal. It will be obvious that by lengthening and shortening these ropes, the length as a whole of the top straps will be increased or diminished for the purpose of accommodating them to various sizes of bundles or bales.

The standards 2 have their upper ends extended beyond or above the beam 1, and in each of the same there is seated the tenon formed at the lower side of a bearing-eye 23. In these bearing-eyes, which are thus in transverse alignment, there is journaled a winding or windlass shaft 24. Between the opposite pairs of bearing-eyes drums 25 are located and adapted to operate with the shaft and beyond said eyes the shaft itself at its ends constitutes windlasses. Limiting or stop ropes 26 are wound upon the ends of the shaft, have their upper ends secured thereto, and their lower extremities passed through slots 27, with which the ends of the beam 1 are provided, terminating below said slots in knots or other stops 28, between which and the side of the beam 1 coiled springs 29 may be mounted. Upon the drums 25, ropes 30 are wound, the upper ends of the ropes being secured to the drum and their lower ends depending back of the beam 1, and secured to clevises 31, mounted upon a transverse suspension-bar 32, located in rear of the standards 2. From this suspension-bar a series of bottom straps 33, in this instance five in number but which may be increased or decreased in accordance with the number of finger-bars 5 and 7, to the outer or upper extremities of which the front ends of the straps are bolted.

Upon the shafts 24, and embracing one of the bearing-eyes 23, is an inverted U-shaped bail 34, the terminals of said bail being provided with transversely-aligning bearing-openings for the shaft. At each side of the aforesaid bail there is mounted fixedly upon the shafts a ratchet-wheel 35. Depending from the bearing-eye thus embraced by the bail, is an arm 36, and bolted to the same and projecting beyond its outer end, is a brace 37, the inner or rear end of which is bolted to the standard 2 in which the eye is mounted. If desired, the braces 37 and arm may all be integrally cast with the bearing-eye. Through the bail above the ratchet-wheels a bolt 39 passes, and upon the opposite ends of the bolt outside the bail gravity-pawls 40 are located, which pawls engage with and operate the ratchet-wheels when the bail is swung to the front and loosely ride over the teeth of said wheels when the bail is swung to the rear, so that at each forward movement of the bail, the two shafts are operated, or if, as will hereinafter appear, one shaft has been sufficiently operated, simply the remaining shaft will engage and be operated.

41 designates an operating lever, the upper end of which terminates in a handle 42, and which may be provided with a handle 43 at one side. This lever is fulcrumed at its lower end, and in this instance at the front ends of the braces 37, upon a fulcrum bolt 44. Above the bolt the lever is provided with two or a series of downwardly-inclined teeth forming intermediate notches 45, into any one of which may be adjusted a loose cuff or clevis 46. The clevis or cuff 46 is provided at its rear side with a small perforation 47, which is designed to receive any one of a series of small studs 48, with which the inclined portions or walls of the notches 45 are provided. The aforesaid cuff or clevis is maintained in locking position with the studs through the medium of a small coiled spring interposed between the rear face of the lever and the front transverse portion of the cuff or clevis. Pivotally bolted at 49 to the rear of the cuff or clevis is a U-shaped link 50, the rear end of which passes through the inverted U-shaped bail and is perforated for the passage of a transverse bolt 39 upon which the pawls are located.

At the outer side of each of the ratchet-wheels 35 there rises from the beam 1 a short post 51, and in each post there is fulcrumed a gravity locking-pawl 52, the front ends of which are heavier than the rear ends, so that the latter are raised into normal engagement with the teeth of the ratchet-wheels. The front ends of the pawls terminate in laterally-disposed handles 53. The short walls of the ratchet teeth of the wheels are preferably concaved, as indicated at 54, and the rear ends of the gravity locking-pawls are bifurcated at 55, and each has journaled upon a transverse pin 56, passing through its bifurcations, a loose anti-friction roller 57, designed to engage with and become seated in the concaved faces of the ratchet-teeth of the wheels, the purpose and object of such rollers being hereinafter stated.

This completes the construction of my preferred form of machine, and before proceeding with a detailed description of the constructions of the two remaining modifications I will describe the operation of the present form, the description of which has been given.

The bail 11 is swung to its rearmost position, thus unlocking the pawl of the cradle-frame from engagement with the ratchet-wheel. The two pawls 40 are now raised from the teeth of the ratchet-wheels 35, and they being released and the two shafts 24, the weight of the bar 32 will serve to unwind the shafts 24, thus slackening the straps 33 and permitting the finger-bars to swing to the front. The limit of their forward swing is determined by the amount of rope 26. By winding more or less of the ropes 26 upon the shafts 24, said ropes being wound reversely upon the shafts to what the ropes 30 are upon the drum, and therefore winding as the drums unwind, it will be seen that the knots or stops 28, at the lower ends of the ropes, will limit the downward movement of the suspension-bar 32. After the straps 33 have been brought to nearly a horizontal position (that is, in case a surrounding jacket of straw is to be employed), a layer of straw is strewn lengthwise thereover to a suitable depth, previous to which strewing the cradle-frame has been locked at its inclined position by a forward swing given the bail 11. The trees, saplings, or shrubs are now piled upon the layer of straw to the number desired to constitute the bale after which additional quantities of straw or other baling material are laid thereupon. The bar 16, which has been at rest upon the brackets 15 is, after the pawl has been withdrawn from the locking-ratchet 9, brought over the bundle or bale thus formed, and engaged with any pair of the teeth 8, formed on the finger-bars 5, in accordance with the size of bale it is desired to complete. If a small bundle is being formed, it may be made sufficiently compact by forcing the bar 16 down the outer sides of the finger-bars so as to engage with the lower teeth thereof, but where large bundles are formed, or greater density and compactness are required, the lever 41 is now brought into use. This lever is swung to the front, and draws with it the inverted U-shaped bail 34, the gravity-pawls 40 of which engaging with the ratchet-wheels 35, rotate the shafts 24, thus winding the ropes 30 upon the drums and unwinding the ropes 26. The drawing up of the ropes 30 elevates the transverse suspension-bar 32, and snugly binds the lower or bottom straps 33 around the lower halves of the bale, and these force the bundle upwardly against the top straps so that a compactness is secured. It will be seen that by varying the location of the cuff or clevis 46, that is arranging it in the various notches 45, greater or less leverage may be secured, and thus the bale be made more or less condensed or compact. As the roots of the trees are larger than the trunks, it will be obvious that the bale will naturally be larger at that end, and consequently the straps at that end will require to be taken up less than those that pass around the trunks and tops, and it is for this compensation or equalization that I employ two shafts 24, and equalizers. Now will be seen the importance of providing the gravity locking-pawls 52 with the anti-friction rollers. The great stress under which the winding shafts, ratchet-wheels and locking-pawls 52 are subjected when the bale is thus bound or formed, renders it difficult to disengage the pawls with the ratchet-wheels. But, by the provision of the anti-friction rollers, it will be seen that while the pawls efficiently lock the ratchet-wheels against any possible accidental disengagement, yet at the same time it requires but a small amount of pressure upon the pawls to withdraw their rear ends from engagement with the teeth, the rollers readily moving out of their seats and over the ends of the teeth. After the bale has thus been formed, it is to be tied or bound, and this I have found difficult to accomplish by reason of the necessity and difficulty of passing the binding-cord between the straps and the trees or saplings. In order to avoid this difficulty, I provide each strap with a space-block $53^a$, and secure to the faces of these blocks short slip-straps $54^b$, the ends of which extend beyond the blocks and lie upon the baling straps. These space-blocks and slip-straps may be located on either the upper or lower baling-straps, but are preferably at similar points on whichever straps they are used, so that their location will be readily apparent to the operator. By employing these slip-straps and blocks, it will be seen that the same combine to form eyes through which the binding-cord may be readily introduced and which will readily disengage with said binding-cord after the trees have been bound. It now remains to provide some means for gathering and holding during tying, the ends of the straw or other material employed in the baling operation. This may be accomplished by hand or by any desired device, but I have herein illustrated one simple form that I have found useful. The device consists simply of a cross-shaped frame comprising, as is intimated, a series of four radiating arms, or a greater number may be employed, said arms being designated as $55^c$ and $56^a$. At the juncture of the series of arms a spike $57^b$ is located, and at the extremities of the two arms 55 small winding drums or windlasses 58 are supported, the same being designed to be operated through the medium of suitable handles 59. A short cord 60, terminates at its ends in eyes 61, and is adapted at said ends to engage with proper hooks 62, one of which is located upon each of the drums 58. The device thus described has its spike $57^b$ pushed into the end of the bale at a central point, and the cord is passed once around the ends of the straw or baling material, beyond the ends of the trees or saplings, said cord passing in rear of the retaining-arms 56 and being thereby prevented from slipping off the end of the straw. The two eyes 61, at the terminals of the cord, are now engaged with the hooks of the drums, and the latter are rotated so as to wind the terminals thereon. By such rotation and winding of the terminals, the loop the cord forms around the straw is constantly decreased until the straw is drawn to a compact mass, in which condition the ordinary binding-cord may be applied and its terminals knotted. The device is then removed, and the bale is in condition to be removed from the machine.

I will now proceed to describe a modified construction of my invention, the illustrations of which will be found in Figs. 6 and 7. In this instance I employ a pair of opposite sills 63, providing the same with pairs of front and rear bearings 64 and 65 respectively. Adjacent to one of the sills 63 and concentric with the bearing thereof I bolt a toothed stationary ratchet 66. Upon the front shaft 67, which is mounted in the bearings 64, there is loosely mounted a series of rearwardly-inclined finger-bars 68, which are connected by a transverse connecting-bar 69. Two of these finger-bars are projected above their companions and shaped to form levers 70, are provided with curved brackets or rests 71, and one has pivoted to its outer side a bell-crank lever 72, a leaf spring serving to normally press the same outwardly. Pivoted, as at 73, to the finger-bar 68 to which the bell-crank lever is secured, is a gravity-pawl 74, the lower toothed end of which is designed to engage with any one of the ratchet-teeth of the ratchet-plate 66. This pawl may be raised out of engagement with the ratchet-plate by the bell-crank 72, which is connected with the pawl through the medium of a wire 75.

76 designates a series of front fingers or bars, two of which are connected at their lower ends to the front shaft 67 by U-shaped metal straps 77, whereby they are pivoted. These fingers or bars 76 are connected in a series by a transverse connecting-bar 78, so that they combine to form the cradle-frame. Two of the bars 76 have their outer or front faces provided with a series of inclined teeth, forming notches 79. Each of the bars 76 is connected to the companion bar 68 by bottom straps 80, which limits the separation of the bars. Each pair of bars 76 and 68 are normally spread apart by an intermediate coiled spring 81, the end of the coil taking over a stud 82 projecting from the rear face of one of the bars 76, and the remaining end of the wire passing through a perforation formed in the companion bar 68.

Removably mounted in the brackets or rests 71, is a transverse bar 83, and depending from the same is a series of straps 84, the lower ends of which are, as in the previous instance described, connected to one or more eveners or equalizing bars 85, which in turn are connected by ropes 86 to a rear transverse shaft or rod 87, mounted in the rear pair of bearings or openings 65 in the sills 63.

The operation of this modified construction will be obvious from the description relative to the previously described construction of the machine; but, in order to avoid misunderstanding, may be briefly stated as follows: The bars 68 are swung to a vertical position, or substantially so, and are locked in that position by the pawl 74 engaging with the ratchet-plate 66. Such engagement is made with the rearmost tooth of the plate, and the shape of the former is such as to prevent movement in either direction or any disengagement of the pawl other than when the pawl is removed by the bell-crank lever, though the remaining teeth of the plate are of the ordinary form. When the rear bars 68 are thus elevated, the spring 81 serves to force the front fingers or bars forwardly, and thus the straps 80 are drawn to a substantially horizontal position across the machine. The layer of straw or other baling material is now laid upon the straps 80, as was previously done when such substance is used, and the trees, saplings, or shrubs piled thereon, the straps 80 yielding to the weight of the trees, saplings or shrubs as will be obvious, and drawing the bars 76 inwardly or to the rear. It now simply remains to disengage the bar 83 from the brackets 71, bringing the same to the front, and beyond the bars 76, engaging it with a convenient pair of teeth with which two of said bars, as previously mentioned, are provided. It now simply remains to grasp the two levers 70 by hand, at the same time disengaging the pawl 74, from the ratchet-plate and exerting strength upon the levers 70 draw the series of bars 68 to the front, which will decrease the length of the straps 84 by reason of the fact that their lower ends are in rear of or eccentric with relation to the point of pivot of the bars 68, or in other words the shaft 67. After the mass has been drawn beyond a vertical point its own weight is exerted with that of the operator, and at the same time the leverage, as will be seen, is increasing. In this manner, though the machine is operated by hand, an extremely compact and secure bale may be formed. Furthermore, the bale when formed is brought close to the ground to which it may be easily delivered. The ends of the straw may be tied by hand or in the manner heretofore described, as will be readily seen.

I will now proceed to describe my third construction or second modification. In this instance I employ a series of sills or bars 90, horizontally disposed, connecting the same at their rear ends by transverse sills 91. These sills 90 have hinged to their upper sides about midway, as at 92, a transverse cleat or connecting-bar 93, from which rises a series of finger-bars 94, constituting the cradle-frame. These finger-bars have hinged to their under sides a transverse bar 95, and from the ends of the same depend curved legs 96, the front ends of which extend forwardly to about the ends of the sills 90 and rest upon the ground. The extremities of the bars 94 and the sills 90 are connected by a series of bottom-straps 97.

To the upper sides of the sills 90, in rear of the points of connection with the straps 97, a series of top straps 98 is connected, and at their outer ends the same are secured to one or more eveners 99, each of which is provided with an eye 100. In pairs of bearings 101, a pair of windlasses 102, are journaled, the same being operated by any desirable ratchet mechanism, preferably like that shown in Fig. 1 of the drawings. Upon these windlasses draft-ropes 103, are wound and secured, and at their upper ends terminate in hooks 104, designed to engage removably with the eyes 100 of the eveners 99. This completes the construction of my second modification, and the operation thereof may be briefly stated as follows:

It will be observed that the standards or legs 96 will cause the cradle-frame or finger-bars 94 to remain open, and the straps 98 are spread out or extended forwardly upon the ground to receive the bundle. After the layer of straw or other baling material, if such be used, is placed in position upon the straps 98, the trees or saplings are piled thereon to the proper number or quantity desired, and the eveners raised and carried to the rear and their eyes 100 engaged with the hooks 104, of the ropes 103. It now simply remains to operate the ratchet-lever and through the medium of the same wind the ropes 103 upon the windlasses, thus drawing the trees or saplings into a compact mass, in which position they are held during the binding operation. As the straps 98 are tightened, it being impossible, on account of the legs 96, for the cradle-frame to descend, the sills 90 will be drawn upward toward the cradle-frame and the bundle or bale elevated from the ground. The operation of binding the bale thus formed is similar to that before described and need not be mentioned.

From the foregoing description in connection with the accompanying drawings, it will be seen that I have provided a machine for conveniently and easily forming saplings, trees, and shrubs into compact bales, whereby they may be conveniently and cheaply either stored or transported. It will further be seen that my invention may be modified in various ways, some of the principal ones of which I have herein illustrated and described. Many other modifications will readily suggest themselves to the skilled mechanic, and I would therefore state that I do not limit my invention to the details herein shown and described, but hold that I may vary the same to any degree within the scope of mechanical skill without departing from my invention.

Having described my invention, what I claim is—

1. In a machine of the class described, the combination with the two frames hinged together at two of their adjacent ends and one of them adapted to swing downward from the remaining, bottom straps connecting the frames, of top-straps connected at their ends with one frame and adapted to be connected at their remaining ends with the remaining frame, and means for applying tension to the series of straps, substantially as specified.

2. In a machine of the class described, the combination with the two frames hinged together at two of their adjacent ends, and one of them adapted to swing downward bottom straps connecting the frames, of top straps connected at their ends with one frame and adapted to be adjustably connected at their remaining ends with the remaining or swinging frame, and means for applying draft to the straps, substantially as specified.

3. In a machine of the class described, the combination with the opposite hinged frames, a suspension-bar located in rear of one of the same, bottom straps connected to the suspension-bar and connected at their opposite ends to the opposite frame, of a winding mechanism, ropes connecting the same and suspension-bar, an evener-bar, means for connecting the same with the machine, straps leading from the evener-bar, and a strap connecting bar secured to the ends of said straps and adapted to engage with the opposite frame, substantially as specified.

4. In a machine of the class described, the combination with the opposite hinged frames, a suspension-bar located in rear of one of the same, bottom straps connected to the suspension-bar and connected at their opposite ends to the opposite frame, of a winding mechanism, ropes connecting the same and suspension-bar, an evener-bar, means for connecting the same with the machine, straps leading from the evener-bar, and a strap connecting bar secured to the ends of said straps and adapted to adjustably engage with the opposite frame, substantially as specified.

5. In a machine of the class described, the combination with the opposite frames one of which comprises finger-bars having a series of teeth upon their outer sides, a suspension-bar located in rear of the rear frame, straps depending therefrom and connected with the front or notched frame, of an equalizing mechanism connected to the bottom, straps connected to the equalizing mechanism, a bar connected to the ends of the straps and adapted to be brought over into engagement with the notches of the bars, and a winding mechanism mounted on the rear frame and connected with the suspension-bar, substantially as specified.

6. In a machine of the class described, the combination with the rear stationary frame, a winding mechanism mounted thereon, and a front hinged frame, of means for adjusting and locking the front hinged frame at a desired inclination, a bar located in rear of the stationary frame, straps connecting the bar with the front frame, connections between the winding mechanism and bar, an equalizer, straps leading therefrom, connecting devices between the straps and base of the machine, and an engaging bar connected with the opposite ends of the straps and adapted for connection with the hinged frame, substantially as specified.

7. In a machine of the class described, the combination with the rear stationary frame mounted upon a base, winding mechanism mounted on the upper end of the frame, a front shaft journaled in the base, a frame pivoted thereon, of a toothed ratchet-plate located at the side of the frame, a pawl secured to the frame and adapted to engage the plate, a U-shaped bail pivoted to one of the bars of the frame and provided at one side of its pivot with a lug, a connecting-wire between the lug and pawl, a suspension-bar located upon the stationary frame, connecting devices between the same and winding mechanism, straps leading from the suspension-bar to the pivoted frame, and straps terminating in a connecting-bar for engaging the pivoted frame and leading from the base, substantially as specified.

8. In a machine of the class described, the combination with the pivoted frame, straps connecting the frames, a bar connected to the ends of the straps, of a transverse winding-shaft, a ratchet-wheel mounted thereon and having its teeth provided with curved seats, a lever and pawl for operating the wheel, a holding-lever adapted at one end to engage the teeth and provided at said end with an anti-friction roller for engaging the seats, and ropes wound upon the shaft and connected to the bar, substantially as specified.

9. In a machine of the class described, the combination with the front and rear hinged frames, a suspension bar located upon the rear frame, straps connected at their rear ends to the bar and at their front ends to the front frame, top straps connecting the two frames, of bearings located upon the upper side of the rear frame, a shaft journaled in the bearings, ropes wound upon the shaft and connected to the suspension-bar, and means for rotating the shaft, substantially as specified.

10. In a machine of the class described, the combination with the front and rear hinged frames, a suspension-bar located upon the rear frame, straps connected at their rear ends to the bar and at their front ends to the front frame, top straps connecting the two frames, of bearings located upon the upper side of the rear frame, a shaft journaled in the bearings, ropes wound upon the shaft and connected to the bar, means for rotating the shaft, and means for arresting said rotation, substantially as specified.

11. In a machine of the class described, the combination with the front and rear hinged frames, the rear one of which is provided with a cross-bar having slots in its ends, a suspension-bar located upon the rear frame, straps leading therefrom to the front hinged frame, top straps leading from the rear frame to the front hinged frame, of bearings mounted upon the cross-bar, a shaft journaled in the bearings and provided with drums, ropes secured to the drums and to the suspension-bar, means for winding the shaft, and stop-ropes reversely wound upon the ends of the shaft, passed through the slots of the bar, and terminating below the same in stops, substantially as specified.

12. In a machine of the class described, the combination with the series of vertical standards having their lower ends bent in reverse direction to form a base, a cross-bar connecting the upper ends of the standards, a series of finger-bars comprising a frame and connected to the lower ends and at the front of the standards, a suspension-bar located in rear of the standards, and straps connected to the suspension-bar, passed between the standards, and connected to the bars of the front frame, of a series of top straps connected with the base of the rear frame, a bar connecting the front ends of the top straps and adapted to be supported upon the cross-bar and removed therefrom and connected with notches formed in the bars of the front frame, and means for giving tension to the suspension-bar, substantially as specified.

13. In a machine of the class described, the combination with the front and rear hinged frames, the latter provided with a cross-bar, a suspension-bar, bottom straps connected therewith and to the front frame, and top straps removably connecting the frames, of a pair of shafts journaled in bearings on the cross-bar of the rear frame, windlasses mounted on the shafts, ropes connected to the windlasses and to the suspension-bar, and a lever adapted to operate either or both shafts, substantially as specified.

14. In a machine of the class described, the combination with the front and rear hinged frames, the latter having a cross-bar, a suspension-bar connected with the rear frame, straps leading therefrom and connected with the front frame, a series of top straps connected with the rear frame and removably connected with the front frame, of bearings upon the cross-bar of the rear frame, a pair of aligning shafts journaled in the bearings, a pair of ratchet-wheels mounted upon the inner ends of the aligning shafts and adapted to move therewith, a bail loosely mounted on the inner ends of the shaft adjacent to the ratchet-wheels, pawls pivoted to the bail and engaging the wheels, a fulcrum, a lever pivoted in the fulcrum, a clevis adjustably mounted on the lever, and a connecting device between the clevis and bail, substantially as specified.

15. In a machine of the class described, the combination with the front and rear hinged frames, the latter having a cross-bar, a suspension-bar connected with the rear frame, straps leading therefrom and connected with the front frame, and a series of top straps connecting the front and rear frames, of a pair of aligning shafts mounted on the cross-bar, ropes wound thereon and connected with the suspension-bar, ratchet-wheels mounted upon the inner ends of and moving with the shafts, an inverted U-shaped bail loosely mounted on the ends of the shafts adjacent to the ratchet-wheels, pawls pivoted on the bail and engaging the wheels, a fulcrum, a hand-lever mounted on the fulcrum and provided with notches in its rear side, a clevis removably mounted in any one of the notches, and a connecting device between the clevis and the bail, substantially as specified.

16. In a machine of the class described, the combination with the front and rear hinged frames, the latter consisting of a series of vertical standards, a cross-bar connecting the same above which the standards project, a suspension-bar connected with the rear frame, straps leading therefrom and connected with the front frame, and a series of top straps removably connecting the frames, of a series of bearing-eyes having tenons mounted in the upper ends of the standards of the rear frame, a pair of shafts journaled in the eyes, ropes passed around the shafts connected thereto and at their lower ends connected to the suspension-bar, ratchet-wheels mounted on the inner ends of the shafts and moving therewith, a bail loosely mounted upon the shafts between the wheels, a bolt passed through the bail, pawls pivoted upon the bolt and engaging the ratchet-wheels, an arm extending downwardly from the intermediate eye or bearing, a brace secured to the outer end of the arm and at its inner end to the standards in which the bearing is mounted, a lever fulcrumed on the outer end of the brace, and connecting devices between the lever and bolt of the bail, substantially as specified.

17. In a machine of the class described, the combination with the front and rear frames hinged together, the suspension-bar connected to the rear frame, straps leading therefrom to the front frame, and top straps leading from the rear frame and removably connected to the front frame, of a cross-bar mounted on the rear frame, bearings mounted on the cross-bar, a pair of shafts journaled in the bearings, ropes wound upon the shafts, secured thereto and at their lower ends to the suspension-bar, a pair of ratchet-wheels mounted on the inner ends of the shafts, an inverted U-shaped bail loosely mounted on the shafts, pawls mounted on the bail and engaging the wheels, a fulcrum below the bail, a hand-lever mounted in the fulcrum and provided above the same with a series of inclined teeth forming notches, each of said teeth being provided with a stud, a cuff or clevis removably embracing a tooth and having an opening for the reception of the stud, a spring interposed between the lever and front end of the cuff or clevis for maintaining it in engagement with the stud, and a bail pivotally connected to the front end of the cuff and to the swinging bail of the shafts, substantially as specified.

18. In a machine of the class described, the combination with the opposite pivoted frames, a suspension-bar connected with the rear frame, straps depending from the bar and connected to the front frame, and means for elevating said suspension-bar, of a base, equalizers adjustably connected to the base, and top straps connected to the equalizers and provided with means for adjustably connecting the same to the front frame, substantially as specified.

19. In a machine of the class described, the combination with the rear frame comprising a series of standards having their lower ends bent in reverse directions, and connecting base-bars, of a front frame hinged to the lower ends of the standards, a suspension-bar in rear of said standards, straps connected to the suspension-bar and to the front frame, an equalizer located adjacent to the standards, ropes connected with the equalizer and adjustably connected with the base-bars, straps connected with the equalizer and adapted for removable connection at their opposite ends with the front frame, and means for elevating the suspension-bar, substantially as specified.

20. In a machine of the class described, the combination with the baling-straps, of a series of blocks secured thereto, and a series of slip straps secured to the upper sides of the blocks and extending beyond the ends of the same forming eyes for the passage of the binding-cord, substantially as specified.

In testimony that I claim the foregoing as my own I have hereto affixed my signature in the presence of two witnesses.

HENRY O. THOMAS.

Witnesses:
  JNO. H. SIGGERS,
  BERNICE A. WOOD.